(12) United States Patent
Teraoka (10) Patent No.: US 11,675,168 B2
(45) Date of Patent: Jun. 13, 2023

(54) CAMERA LENS INCLUDING SEVEN LENSES OF −++−+−− REFRACTIVE POWERS

(71) Applicant: AAC Optics Solutions Pte. Ltd., Singapore (SG)

(72) Inventor: Hiroyuki Teraoka, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 458 days.

(21) Appl. No.: 17/080,850

(22) Filed: Oct. 27, 2020

(65) Prior Publication Data

US 2022/0091375 A1 Mar. 24, 2022

(30) Foreign Application Priority Data

Sep. 18, 2020 (JP) .............................. JP2020-156881

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

2019/0129138 A1* 5/2019 Sato ................... G02B 27/0037

* cited by examiner

*Primary Examiner* — Wen Huang
(74) *Attorney, Agent, or Firm* — W&G Law Group (57) ABSTRACT

The present invention provides a camera lens having good optical characteristics, a wide angle, and a small size, and constituted by seven lenses. The camera lens includes, from an object side: a first lens having a negative refractive power; a second lens having positive refractive power; a third lens having positive refractive power; a fourth lens having a negative refractive power; a fifth lens having positive refractive power; a sixth lens having a negative refractive power; and a seventh lens having a negative refractive power. The camera lens satisfies given relational formulas.

5 Claims, 5 Drawing Sheets

CAMERA LENS INCLUDING SEVEN LENSES OF −++−+−− REFRACTIVE POWERS

TECHNICAL FIELD

The present invention relates to a camera lens and, in particular, to a camera lens that is suitable for portable module cameras and WEB cameras which use imaging elements such as CCD and CMOS for high resolution, and has a full-field view angle (hereinafter, set to 2ω) of a 125° or larger wide angle, a small size and good optical characteristics, and is constituted by seven lenses.

BACKGROUND

In recent years, various imaging devices using imaging elements such as CCD and CMOS have been widely spread. With miniaturization and higher and higher performance of these imaging elements, a camera lens that has a wide angle, a small size and good optical characteristics is required.

Technology development related to the camera lens constituted by seven lenses, which has a wide angle, a small size and good optical characteristics, is advancing. As for a camera lens including the seven lens, it generally includes: from an object side, a first lens having negative refractive power, a second lens having a positive refractive power, a third lens having a positive refractive power, a fourth lens having negative refractive power, a fifth lens having a positive refractive power, a sixth lens having negative refractive power, and a seventh lens having negative refractive power.

Regarding the camera lens, the refractive power of the first lens and the refractive power of the second lens, and a ratio of a curvature radius of an object side surface of the second lens to a curvature radius of an image side surface of the second lens are insufficient, so the wide angle and miniaturization thereof are insufficient.

SUMMARY

Problem to Be Solved

An object of the present invention is to provide a camera lens that is constituted by seven lenses and has a wide angle, a small size and good optical characteristics.

Solutions to Solve the Problem

In order to achieve the object, the refractive power of the first lens and the refractive power of the second lens, and a ratio of a curvature radius of an object side surface of the second lens to a curvature radius of an image side surface of the second lens have been intensively investigated, a camera lens which can solve the problem exiting in the prior art is obtained, and thus the present invention is accomplished.

A camera lens, including, sequentially from an object side: a first lens having a negative refractive power; a second lens having a positive refractive power; a third lens having a positive refractive power; a fourth lens having a negative refractive power; a fifth lens having a positive refractive power; a sixth lens having a negative refractive power; and a seventh lens having a negative refractive power. The camera lens satisfies relational formulas (1)-(3):

$$-2.00 \leq f1/f \leq -1.67 \tag{1}$$

$$1.20 \leq f2/f \leq 1.60 \tag{2}$$

$$10.00 \leq |R3/R4| \leq 60.00 \tag{3}$$

where f represents a focal length of the camera lens as a whole, f1 represents a focal length of the first lens, f2 represents a focal length of the second lens, R3 represents a curvature radius of an object side surface of the second lens, and R4 represents a curvature radius of an image side surface of the second lens.

As an improvement, the camera lens further satisfies a relational formula (4):

$$1.80 \leq f3/f \leq 3.00 \tag{4}$$

where f3 represents a focal length of the third lens.

As an improvement, the camera lens further satisfies a relational formula (5):

$$-4.00 \leq f4/f \leq -2.00 \tag{5}$$

where f4 represents a focal length of the fourth lens.

As an improvement, the camera lens further satisfies a relational formula (6):

$$5.00 \leq |R5/R6| \leq 35.00 \tag{6}$$

where R5 represents a curvature radius of an object side surface of the third lens, and R6 represents a curvature radius of an image side surface of the third lens.

As an improvement, the camera lens further satisfies a relational formula (7):

$$0.50 \leq D23/f \leq 0.70 \tag{7}$$

where D23 represents an on-axis distance from the object side surface of the second lens to an image side surface of the third lens.

Effects of the Present Invention

The present invention particularly provides a camera lens that is suitable for portable module cameras and WEB cameras which use imaging elements such as CCD and CMOS high resolution, has a wide angle, 2ω>125°, a small size and good optical characteristics, and is constituted by seven lenses.

DESCRIPTION OF EMBODIMENTS

An implementation manner of a camera lens according to the present invention will be described. The camera lens LA includes a lens system, and the lens system is a 7-lens structure including, from an object side to an image side, a first lens L1, a second lens L2, a third lens L3, a fourth lens L4, a fifth lens L5, a sixth lens L6, and a seventh lens L7. A glass plate GF is provided between the seventh lens L7 and an image surface. Cover glass, various filters, etc. are available as the glass plate GF. In the present invention, the glass plate GF can be arranged in different positions, or can be omitted.

The first lens L1 is a lens having a negative refractive power, the second lens L2 is a lens having a positive refractive power, the third lens L3 is a lens having a positive refractive power, the fourth lens L4 is a lens having a negative refractive power, the fifth lens L5 is a lens having a positive refractive power, the sixth lens L6 is a lens having a negative refractive power, and the seventh lens L7 is a lens having a negative refractive power. Regarding surfaces of these seven lenses, in order to correct various aberrations satisfactorily, it is desired to set each of these surfaces into an aspheric shape.

The camera lens LA satisfies the following relational formula (1).

$$-2.00 \leq f1/f \leq -1.67 \quad (1)$$

The relational formula (1) is a ratio of a focal length f1 of the first lens L1 to a focal length f of an entire camera lens LA, and defines the negative refractive power of the first lens L1. By setting it within a range of the relational formula (1), correction of various aberrations under a wide angle and miniaturization is easy, therefore being preferable.

The camera lens LA satisfies the following relational formula (2).

$$1.20 \leq f2/f \leq 1.60 \quad (2)$$

The relational formula (2) is a ratio of a focal length f2 of the second lens L2 to the focal length f of the entire camera lens LA, and defines the positive refractive power of the second lens L2. By setting it within a range of the relational formula (2), correction of various aberrations under a wide angle and miniaturization is easy, therefore being preferable.

The camera lens LA satisfies the following relational formula (3).

$$10.00 \leq R3/R4 \leq 60.00 \quad (3)$$

The relational formula (3) defines a ratio of a curvature radius R3 of an object side surface S3 of the second lens L2 to a curvature radius R4 of an image side surface S4 of the second lens L2. By setting it within a range of the relational formula (3), correction of various aberrations under a wide angle and miniaturization is easy, therefore being preferable.

The camera lens LA satisfies the following relational formula (4).

$$1.80 \leq f3/f \leq 3.00 \quad (4)$$

The relational formula (4) is a ratio of a focal length f3 of the third lens L3 to the focal length f of the entire camera lens LA, and defines the positive refractive power of the third lens L3. By setting it within a range of the relational formula (4), correction of various aberrations under a wide angle and miniaturization is easy, therefore being preferable.

The camera lens LA satisfies the following relational formula (5).

$$-4.00 \leq f4/f \leq -2.00 \quad (5)$$

The relational formula (5) is a ratio of a focal length f4 of the fourth lens L4 to the focal length f of the entire camera lens LA, and defines the negative refractive power of the fourth lens L4. By setting it within a range of the relational formula (4), correction of on-axis and off-axis chromatic aberrations under a wide angle and miniaturization is easy, therefore being preferable.

The camera lens LA satisfies the following relational formula (6).

$$5.00 \leq |R5/R6| \leq 35.00 \quad (6)$$

The relational formula (6) defines a ratio of a curvature radius R5 of an object side surface S5 of the third lens L3 to a curvature radius R6 of an image side surface S6 of the third lens L3. By setting it within a range of the relational formula (6), correction of various aberrations under a wide angle and miniaturization is easy, therefore being preferable.

The camera lens LA satisfies the following relational formula (7).

$$0.50 \leq D23/f \leq 0.70 \quad (7)$$

The relational formula (7) defines a ratio of an on-axis distance D23 from the object side surface S3 of the second lens L2 to the image side surface S6 of the third lens L3 to the focal length f of the entire camera lens LA. By setting it within a range of the relational formula (7), correction of various aberrations under a wide angle and miniaturization is easy, therefore being preferable.

By making the seven lenses constituting the camera lens LA satisfy the above configuration and relational formulas, it is possible to obtain a camera lens constituted by seven lenses and having a wide angle, $2\omega > 125°$, a small size, and good optical characteristics.

EMBODIMENTS

Hereinafter, embodiments are provided for illustrating the camera lens LA of the present invention. The reference numerals described in the embodiments are listed below. In addition, the distance, the radius, and the center thickness have a unit of mm.

f: focal length of an entire camera lens LA
f1: focal length of a first lens L1
f2: focal length of a second lens L2
f3: focal length of a third lens L3
f4: focal length of a fourth lens L4
f5: focal length of a fifth lens L5
f6: focal length of a sixth lens L6
f7: focal length of a seventh lens L7
Fno: F-number
2ω: full-field view angle
STOP: aperture
R: curvature radius of an optical surface, center curvature radius in a case of a lens
R1: curvature radius of an object side surface S1 of the first lens L1
R2: curvature radius of an image side surface S2 of the first lens L1

R3: curvature radius of an object side surface S3 of the second lens L2

R4: curvature radius of an image side surface S4 of the second lens L2

R5: curvature radius of an object side surface S5 of the third lens L3

R6: curvature radius of an image side surface S6 of the third lens L3

R7: curvature radius of an object side surface S7 of the fourth lens L4

R8: curvature radius of an image side surface S8 of the fourth lens L4

R9: curvature radius of an object side surface S9 of the fifth lens L5

R10: curvature radius of an image side surface S10 of the fifth lens L5

R11: curvature radius of an object side surface S11 of the sixth lens L6

R12: curvature radius of an image side surface S12 of the sixth lens L6

R13: curvature radius of an object side surface S13 of the seventh lens L7

R14: curvature radius of an image side surface S14 of the seventh lens L7

R15: curvature radius of an object side surface S15 of a glass plate GF

R16: curvature radius of an image side surface S16 of the glass plate GF d: center thickness of a lens or a distance between lenses d1: center thickness of the first lens L1 d2: on-axis distance from the image side surface S2 of the first lens L1 to the aperture STOP d3: on-axis distance from the aperture STOP to the object side surface S3 of the second lens L2 d4: center thickness of the second lens L2 d5: on-axis distance from the image side surface S4 of the second lens L2 to the object side surface S5 of the third lens L3 d6: center thickness of the third lens L3 d7: on-axis distance from the image side surface S6 of the third lens L3 to the object side surface S7 of the fourth lens L4 d8: center thickness of the fourth lens L4 d9: on-axis distance from the image side surface S8 of the fourth lens L4 to the object side surface S9 of the fifth lens L5 d10: center thickness of the fifth lens L5 d11: on-axis distance from the image side surface S10 of the fifth lens L5 to the object side surface S11 of the sixth lens L6 d12: center thickness of the sixth lens L6 d13: on-axis distance from the image side surface S12 of the sixth lens L6 to the object side surface S13 of the seventh lens L7 d14: center thickness of the seventh lens L7 d15: on-axis distance from the image side surface S14 of the seventh lens L7 to the object side surface S15 of the glass plate GF d16: center thickness of the glass plate GF d17: on-axis distance from the image side surface S16 of the glass plate GF to an image surface D23: on-axis distance from the object side surface S3 of the second lens L2 to the image side surface S5 of the third lens nd: refractive index of d line nd1: refractive index of d line of the first lens L1 nd2: refractive index of d line of the second lens L2 nd3: refractive index of d line of the third lens L3 nd4: refractive index of d line of the fourth lens L4 nd5: refractive index of d line of the fifth lens L5 nd6: refractive index of d line of the sixth lens L6 nd7: refractive index of d line of the seventh lens L7 ndg: refractive index of d line of the glass plate GF

ν: Abbe number

ν1: Abbe number of the first lens L1

ν2: Abbe number of the second lens L2

ν3: Abbe number of the third lens L3

ν4: Abbe number of the fourth lens L4

ν5: Abbe number of the fifth lens L5

ν6: Abbe number of sixth lens L6

ν7: Abbe number of the seventh lens L7

νg: Abbe number of the glass plate GF

TTL: optical length (on-axis distance from the object side surface S1 of the first lens L1 to the image surface)

LB: on-axis distance from the image side surface S14 of the seventh lens L7 to the image surface (including a thickness of the glass plate GF)

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \qquad (8)$$

For convenience, an aspheric surface of each lens surface uses an aspheric surface illustrated by formula (8). However, the present invention is not limited to the aspheric surface's polynomial of formula (8).

Embodiment 1

Figure 1:
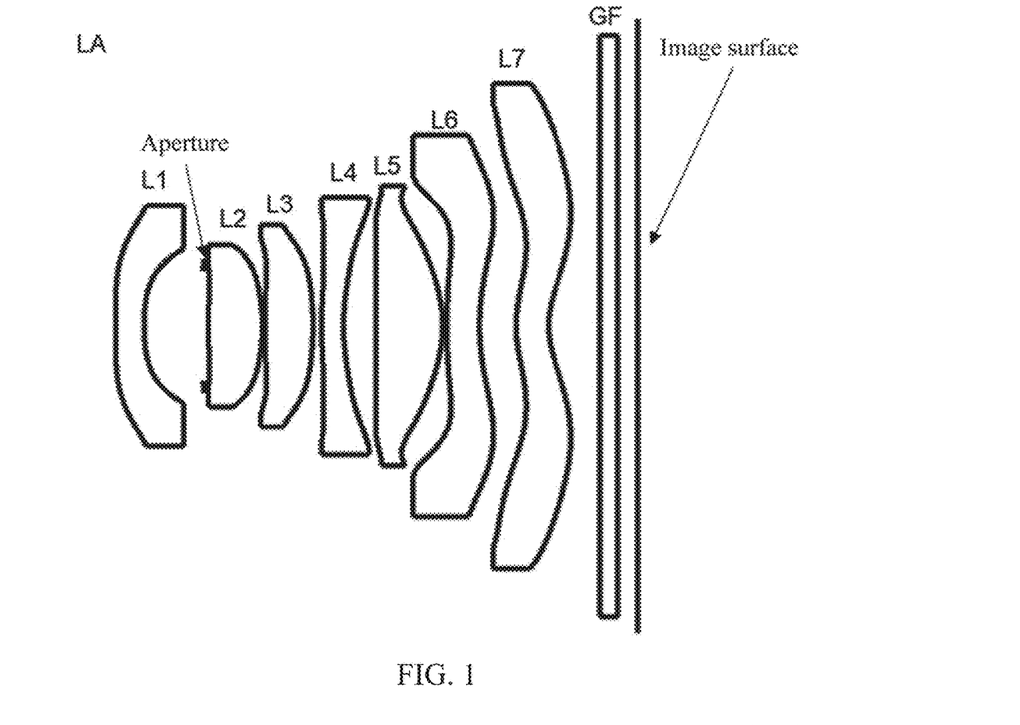
FIG. 1 is a diagram illustrating a schematic configuration of a camera lens LA of Embodiment 1 of the present invention.

FIG. 1 is a diagram illustrating a schematic configuration of a camera lens LA of Embodiment 1 of the present invention. For the object side and the image side of each of the first lens L1 to the seventh lens L7 constituting the camera lens LA of Embodiment 1, the curvature radius R, the center thickness of the lens or the distance between the lenses d, the refractive index nd, and the Abbe number ν are shown in Table 1; a cone coefficient k and an aspheric surface coefficient are shown in Table 2; and 2ω, Fno, f, f1, f2, f3, f4, f5, f6, f7, TTL, and IH are shown in Table 3.

TABLE 1

|  |  | R | d | nd | ν d | Effective radius (mm) |
|---|---|---|---|---|---|---|
| S1 | R1 | −12.42013 | d1= 0.329 | nd1 1.5438 | ν 1 56.03 | 1.399 |
| S2 | R2 | 2.71392 | d2= 0.694 |  |  | 0.897 |
| STOP |  | ∞ | d3= 0.056 |  |  | 0.661 |
| S3 | R3 | 17.48518 | d4= 0.627 | nd2 1.5438 | ν 2 56.03 | 0.727 |
| S4 | R4 | −1.74503 | d5= 0.030 |  |  | 0.944 |
| S5 | R5 | −24.05337 | d6= 0.558 | nd3 1.5438 | ν 3 56.03 | 1.107 |
| S6 | R6 | −3.39871 | d7= 0.100 |  |  | 1.170 |
| S7 | R7 | 5.06567 | d8= 0.260 | nd4 1.6700 | ν 4 19.39 | 1.313 |

TABLE 1-continued

|     | R       | d           | nd   | ν d        | Effective radius (mm) |
| --- | ------- | ----------- | ---- | ---------- | --------------------- |
| S8  | R8      | 2.36528 d9= 0.378     |        |            | 1.492 |
| S9  | R9      | 13.84527 d10= 0.775 nd5 | 1.5438 | ν 5 56.03 | 1.551 |
| S10 | R10     | −1.61151 d11= 0.050   |        |            | 1.627 |
| S11 | R11     | 9.88014 d12= 0.380 nd6  | 1.6700 | ν 6 19.39 | 1.752 |
| S12 | R12     | 2.79334 d13= 0.423    |        |            | 2.211 |
| S13 | R13     | 1.38743 d14= 0.380 nd7  | 1.6610 | ν 7 20.53 | 2.582 |
| S14 | R14     | 0.94499 d15= 0.600    |        |            | 2.812 |
| S15 | R15     | ∞ d16= 0.210 ndg       | 1.5168 | ν g 64.20 | 3.294 |
| S16 | R16     | ∞ d17= 0.232           |        |            | 3.369 |

Reference wavelength = 588 nm

TABLE 2

| | cone cofficient | Aspheric surface coefficient | | | |
| --- | --- | --- | --- | --- | --- |
| | k | A4 | A6 | A8 | A10 |
| S1  | 0.0000E+00  | 3.4050E−01  | −3.6620E−01 | 4.2852E−01  | −4.1184E−01 |
| S2  | 0.0000E+00  | 4.0221E−01  | 9.6980E−01  | −7.5346E+00 | 3.1097E+01 |
| S3  | 0.0000E+00  | 1.6067E−02  | −2.6937E−01 | 7.3578E−01  | 5.9391E−01 |
| S4  | 0.0000E+00  | 8.6854E−01  | −5.5210E+00 | 2.1446E+01  | −6.0115E+01 |
| S5  | 0.0000E+00  | 9.3337E−01  | −5.2949E+00 | 1.8803E+01  | −4.7404E+01 |
| S6  | 5.2438E+00  | 9.7947E−02  | −3.3239E−01 | −2.2134E−01 | 1.8164E+00 |
| S7  | 0.0000E+00  | −1.5192E−01 | 3.9195E−01  | −1.5430E+00 | 2.9974E+00 |
| S8  | 0.0000E+00  | −2.6103E−01 | 7.3102E−01  | −1.6825E+00 | 2.5422E+00 |
| S9  | 0.0000E+00  | −1.8229E−01 | 4.4853E−01  | −7.2400E−01 | 8.1251E−01 |
| S10 | −6.4689E+00 | −1.0746E−01 | 1.8349E−01  | −1.9240E−01 | 7.1028E−02 |
| S11 | 0.0000E+00  | 1.0043E−01  | −1.6285E−01 | 1.0100E−01  | −8.1088E−02 |
| S12 | 0.0000E+00  | −1.6531E−03 | −7.0202E−02 | 3.5594E−02  | −9.8497E−03 |
| S13 | −6.0067E+00 | −2.0754E−01 | 1.1538E−01  | −6.0379E−02 | 2.6934E−02 |
| S14 | −4.2380E+00 | −1.6449E−01 | 9.8893E−02  | −4.7807E−02 | 1.6190E−02 |

| | Aspheric surface coefficient | | | | |
| --- | --- | --- | --- | --- | --- |
| | A12 | A14 | A16 | A18 | A20 |
| S1  | 2.8785E−01  | −1.3329E−01 | 3.4837E−02  | −3.8059E−03 | 0.0000E+00 |
| S2  | −7.6523E+01 | 1.1904E+02  | −1.1286E+02 | 5.9162E+01  | −1.3289E+01 |
| S3  | −1.9065E+01 | 7.9482E+01  | −1.5891E+02 | 1.5661E+02  | −6.0543E+01 |
| S4  | 1.1745E+02  | −1.5465E+02 | 1.2974E+02  | −6.2421E+01 | 1.3069E+01 |
| S5  | 8.1232E+01  | −9.1322E+01 | 6.3813E+01  | −2.4909E+01 | 4.1270E+00 |
| S6  | −3.9178E+00 | 5.2297E+00  | −4.3606E+00 | 2.0031E+00  | −3.7764E−01 |
| S7  | −2.9447E+00 | 1.4990E+00  | −3.3964E−01 | 3.4893E−03  | 7.6378E−03 |
| S8  | −2.3586E+00 | 1.3372E+00  | −4.5364E−01 | 8.4774E−02  | −6.7332E−03 |
| S9  | −6.5112E−01 | 3.6413E−01  | −1.3183E−01 | 2.7374E−02  | −2.4648E−03 |
| S10 | 4.8117E−02  | −7.0448E−02 | 3.5965E−02  | −8.5988E−03 | 7.9120E−04 |
| S11 | 6.2681E−02  | −3.5371E−02 | 1.2225E−02  | −2.1915E−03 | 1.5352E−04 |
| S12 | 1.0920E−03  | 2.6875E−04  | −1.1717E−04 | 1.6298E−05  | −8.2232E−07 |
| S13 | −8.1822E−03 | 1.5789E−03  | −1.8570E−04 | 1.2151E−05  | −3.3924E−07 |
| S14 | −3.5578E−03 | 4.9153E−04  | −4.0855E−05 | 1.8461E−06  | −3.4308E−08 |

TABLE 3

| 2ω (°)   | 130.0  |
| -------- | ------ |
| Fno      | 2.20   |
| f (mm)   | 2.419  |
| f1 (mm)  | −4.065 |
| f2 (mm)  | 2.952  |
| f3 (mm)  | 7.210  |
| f4 (mm)  | −6.889 |
| f5 (mm)  | 2.702  |
| f6 (mm)  | −5.941 |
| f7 (mm)  | −6.811 |
| TTL (mm) | 6.080  |
| LB (mm)  | 1.042  |
| IH (mm)  | 3.552  |

Table 16 described later shows the values corresponding to the parameters defined by the relational formulas (1) to (7) of Embodiment 1 to Embodiment 5.

Embodiment 1 is as shown in Table 16, and satisfies the relational formulas (1) to (7).

Figure 2:
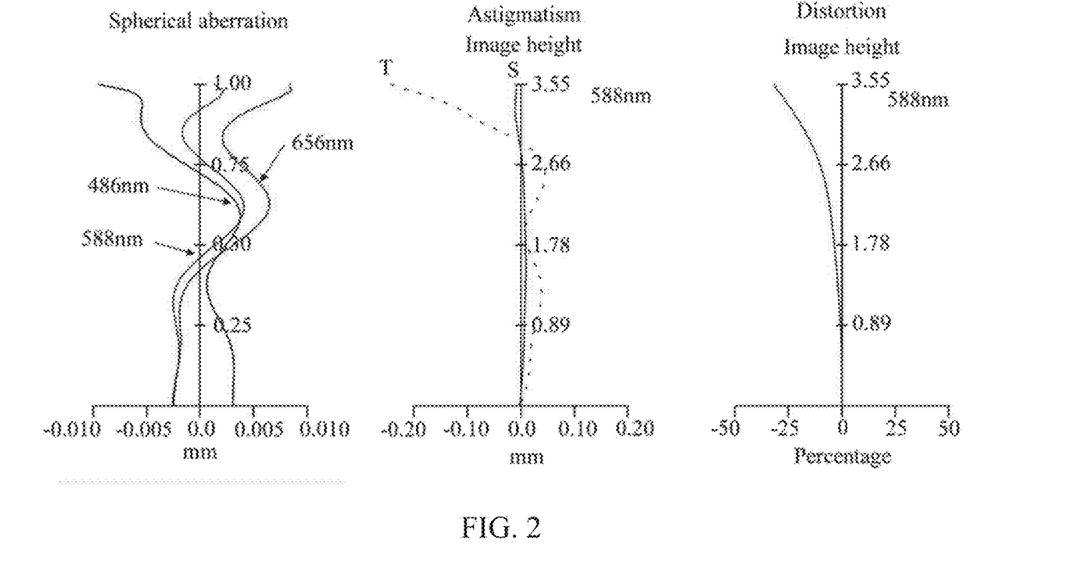
FIG. 2 is a diagram illustrating spherical aberration, astigmatism, and distortion of the camera lens LA of Embodiment 1 of the present invention.

The spherical aberration, astigmatism, and distortion of the camera lens LA of Embodiment 1 are shown in FIG. 2. In addition, S of the field curvature of the figure is the field curvature for a sagittal image surface, and T is the field curvature for a meridional image surface, and the same applies to Embodiment 2 to Embodiment 5. It is shown in FIG. 2 that the camera lens LA of Embodiment 1 has a wide angle with 2ω=130.0°, and TTL=6.080 mm, a small size and good optical characteristics.

Embodiment 2

Figure 3:
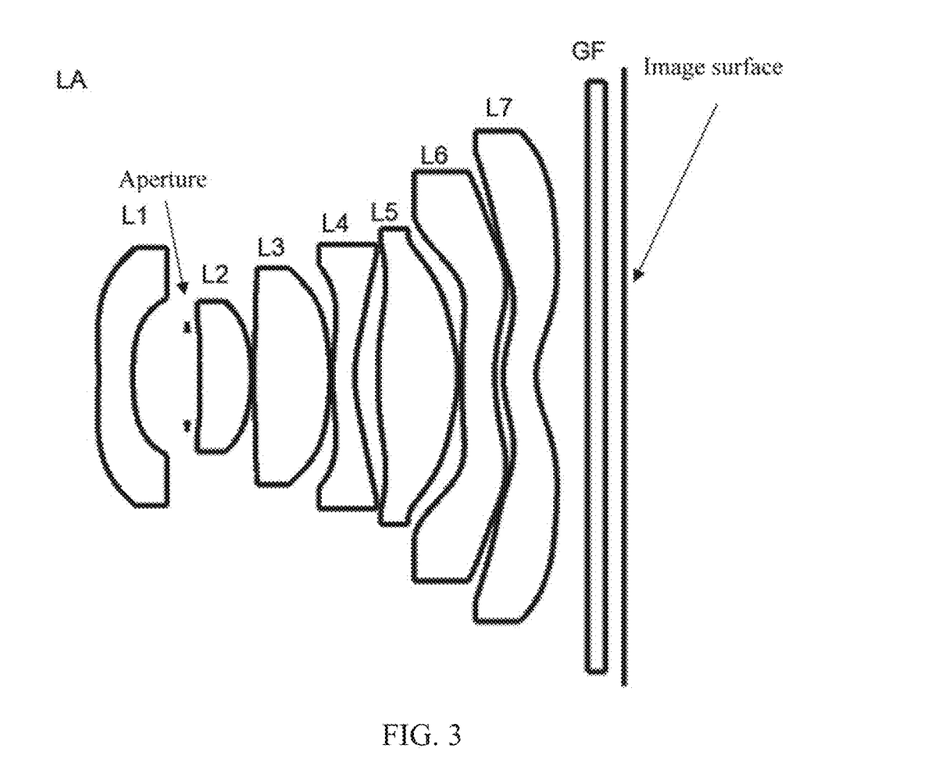
FIG. 3 is a diagram illustrating a schematic configuration of a camera lens LA of Embodiment 2 of the present invention.

FIG. 3 is a diagram illustrating a schematic configuration of a camera lens LA of Embodiment 2 of the present invention. For the object side and the image side of each of the first lens L1 to the seventh lens L7 constituting the camera lens LA of Embodiment 2, the curvature radius R, the center thickness of the lens or the distance between the lenses d, the refractive index nd, and the Abbe number ν are as shown in Table 4; a cone coefficient k and an aspheric surface coefficient are as shown in Table 5; and 2ω, Fno, f, f1, f2, f3, f4, f5, f6, f7, TTL, and IH are as shown in Table 6.

TABLE 4

|  |  | R | d |  | nd |  | ν d | Effective radius (mm) |
|---|---|---|---|---|---|---|---|---|
| S1 | R1 | −5.05130 | d1= | 0.400 | nd1 | 1.5438 | ν 1  56.03 | 1.492 |
| S2 | R2 | 4.65973 | d2= | 0.627 |  |  |  | 0.912 |
| STOP |  | ∞ | d3= | 0.147 |  |  |  | 0.541 |
| S3 | R3 | 116.04444 | d4= | 0.597 | nd2 | 1.5438 | ν 2  56.03 | 0.654 |
| S4 | R4 | −1.93730 | d5= | 0.030 |  |  |  | 0.876 |
| S5 | R5 | 38.05255 | d6= | 0.886 | nd3 | 1.5438 | ν 3  56.03 | 1.137 |
| S6 | R6 | −2.79445 | d7= | 0.030 |  |  |  | 1.253 |
| S7 | R7 | 3.28115 | d8= | 0.260 | nd4 | 1.6700 | ν 4  19.39 | 1.283 |
| S8 | R8 | 2.04173 | d9= | 0.269 |  |  |  | 1.528 |
| S9 | R9 | 14.26090 | d10= | 0.920 | nd5 | 1.5438 | ν 5  56.03 | 1.546 |
| S10 | R10 | −1.65814 | d11= | 0.050 |  |  |  | 1.704 |
| S11 | R11 | 18.16675 | d12= | 0.380 | nd6 | 1.6700 | ν 6  19.39 | 1.839 |
| S12 | R12 | 3.08678 | d13= | 0.097 |  |  |  | 2.359 |
| S13 | R13 | 1.36099 | d14= | 0.380 | nd7 | 1.6610 | ν 7  20.53 | 2.586 |
| S14 | R14 | 0.90828 | d15= | 0.600 |  |  |  | 2.832 |
| S15 | R15 | ∞ | d16= | 0.210 | ndg | 1.5168 | ν g  64.20 | 3.326 |
| S16 | R16 | ∞ | d17= | 0.217 |  |  |  | 3.405 |

Reference wavelength = 588 nm

TABLE 5

|  | Cone coefficient | Aspheric surface coefficient | | | |
|---|---|---|---|---|---|
|  | k | A4 | A6 | A8 | A10 |
| S1 | 0.0000E+00 | 3.1002E−01 | −2.9503E−01 | 2.8317E−01 | −2.0299E−01 |
| S2 | 0.0000E+00 | 4.7195E−01 | −7.3024E+00 | 4.3040E+00 | −2.0176E+01 |
| S3 | 0.0000E+00 | −2.2917E−01 | 3.0147E+00 | −4.0832E+01 | 3.1759E+02 |
| S4 | 0.0000E+00 | 2.2146E−01 | −1.3293E+00 | −1.1163E+00 | 2.3486E+01 |
| S5 | 0.0000E+00 | 4.4416E−01 | −2.2998E+00 | 6.8026E+00 | −1.3770E+01 |
| S6 | 3.5223E+00 | 6.1073E−02 | 3.1613E−02 | −2.2312E−01 | −3.5366E−01 |
| S7 | 0.0000E+00 | −1.8678E−02 | −6.9474E−01 | 1.5054E+00 | −1.4444E+00 |
| S8 | 0.0000E+00 | 1.7011E−01 | −1.3565E+00 | 2.8860E+00 | −3.5697E+00 |
| S9 | 0.0000E+00 | 3.1398E−01 | −5.7234E−01 | 5.8151E−01 | −5.6608E−01 |
| S10 | −1.0721E+01 | −7.2996E−02 | 3.8193E−01 | −5.9229E−01 | 2.7739E−01 |
| S11 | 0.0000E+00 | 7.7374E−02 | −2.8223E−02 | −1.3380E−01 | 2.4273E−02 |
| S12 | 0.0000E+00 | 1.3199E−01 | −2.9886E−01 | 1.7046E−01 | −4.9096E−02 |
| S13 | −4.9590E+00 | −5.2442E−02 | −3.4439E−01 | 3.8477E−01 | −1.9652E−01 |
| S14 | −2.3757E+00 | −3.2066E−01 | 1.8674E−01 | −6.8573E−02 | 1.7729E−02 |

|  | Aspheric surface coefficient | | | | |
|---|---|---|---|---|---|
|  | A12 | A14 | A16 | A18 | A20 |
| S1 | 1.0617E−01 | −3.8477E−02 | 8.9235E−03 | −1.0171E−03 | 0.0000E+00 |
| S2 | 6.1045E+01 | −1.1129E+02 | 1.1847E+02 | −6.6383E+01 | 1.4613E+01 |
| S3 | −1.5576E+03 | 4.8439E+03 | −9.2598E+03 | 9.9062E+03 | −4.5339E+03 |
| S4 | −8.7878E+01 | 1.7161E+02 | −1.9034E+02 | 1.1292E+02 | −2.7833E+01 |
| S5 | 1.8629E+01 | −1.6718E+01 | 9.1499E+00 | −2.7899E+00 | 3.6154E−01 |
| S6 | 1.3030E+00 | −1.5539E+00 | 1.0212E+00 | −3.7599E−01 | 6.0364E−02 |
| S7 | −4.1465E−02 | 1.3557E+00 | −1.2160E+00 | 4.4998E−01 | −6.2605E−02 |
| S8 | 2.8343E+00 | −1.4554E+00 | 4.6559E−01 | −8.4193E−02 | 6.5602E−03 |
| S9 | 5.4464E−01 | −3.8429E−01 | 1.6416E−01 | −3.7321E−02 | 3.4531E−03 |
| S10 | 9.2762E−02 | −1.5303E−01 | 6.6167E−02 | −1.2843E−02 | 9.5660E−04 |
| S11 | 7.4304E−02 | −5.2579E−02 | 1.5103E−02 | −2.0312E−03 | 1.0372E−04 |
| S12 | 7.7268E−03 | −5.7182E−04 | −5.5657E−06 | 4.1023E−06 | −2.2104E−07 |
| S13 | 5.7803E−02 | −1.0559E−02 | 1.1784E−03 | −7.3834E−05 | 1.9926E−06 |
| S14 | −3.3963E−03 | 4.6610E−04 | −4.2170E−05 | 2.2082E−06 | −5.0026E−08 |

TABLE 6

| 2ω (°) | 130.0 |
|---|---|
| Fno | 2.40 |
| f (mm) | 2.208 |
| f1 (mm) | −4.393 |
| f2 (mm) | 3.510 |

TABLE 6-continued

| | |
|---|---|
| f3 (mm) | 4.824 |
| f4 (mm) | −8.809 |
| f5 (mm) | 2.788 |
| f6 (mm) | −5.607 |
| f7 (mm) | −6.203 |
| TTL (mm) | 6.100 |
| LB (mm) | 1.027 |
| IH (mm) | 3.552 |

Embodiment 2 is as shown in Table 16, and satisfies the relational formulas (1) to (7).

Figure 4:
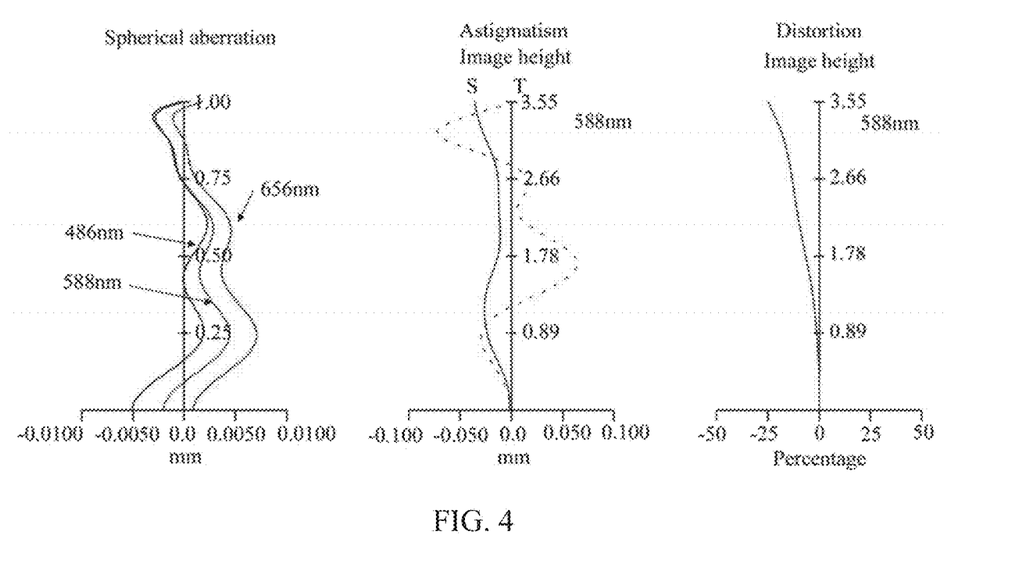
FIG. 4 is a diagram illustrating spherical aberration, astigmatism, and distortion of the camera lens LA of Embodiment 2 of the present invention.

The spherical aberration, astigmatism, and distortion of the camera lens LA of Embodiment 2 are as shown in FIG. 4. It is shown in FIG. 4 that the camera lens LA of Embodiment 2 has a wide angel with $2\omega=130.0°$ and TTL=6.100 mm, a small size and good optical characteristics.

Embodiment 3

Figure 5:
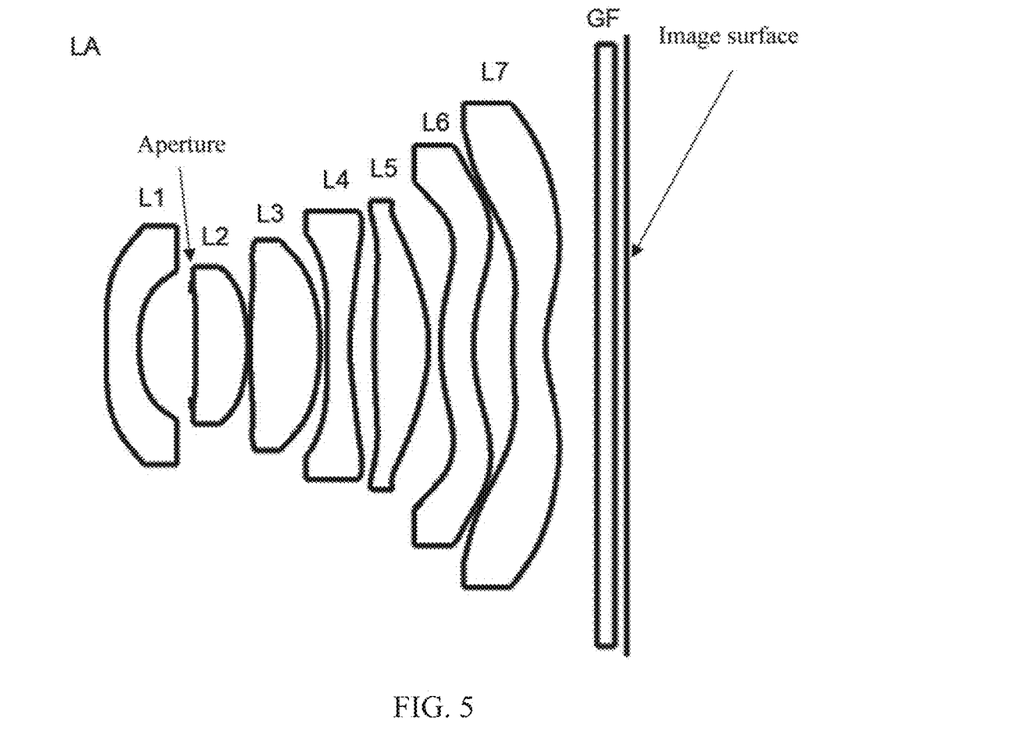
FIG. 5 is a diagram illustrating a schematic configuration of a camera lens LA of Embodiment 3 of the present invention.

FIG. 5 is a diagram illustrating a schematic configuration of a camera lens LA of Embodiment 3 of the present invention. For the object side and the image side of each of the first lens L1 to the seventh lens L7 constituting the camera lens LA of Embodiment 3, the curvature radius R, the center thickness of the lens or the distance between the lenses d, the refractive index nd, and the Abbe number ν are as shown in Table 7; a cone coefficient k and an aspheric surface coefficient are as shown in Table 8; and $2\omega$, Fno, f, f1, f2, f3, f4, f5, f6, f7, TTL, and IH are as shown in Table 9.

TABLE 7

| | | R | d | | nd | | ν d | Effective radius (mm) |
|---|---|---|---|---|---|---|---|---|
| S1 | R1 | −21.52586 | d1= | 0.380 | nd1 | 1.5438 | ν 1  56.03 | 1.384 |
| S2 | R2 | 2.62003 | d2= | 0.609 | | | | 0.869 |
| STOP | | ∞ | d3= | 0.045 | | | | 0.635 |
| S3 | R3 | −114.81606 | d4= | 0.603 | nd2 | 1.5438 | ν 2  56.03 | 0.667 |
| S4 | R4 | −1.91681 | d5= | 0.030 | | | | 0.915 |
| S5 | R5 | 30.22071 | d6= | 0.809 | nd3 | 1.5438 | ν 3  56.03 | 1.181 |
| S6 | R6 | −2.53164 | d7= | 0.076 | | | | 1.223 |
| S7 | R7 | 30.16984 | d8= | 0.272 | nd4 | 1.6700 | ν 4  19.39 | 1.287 |
| S8 | R8 | 2.90222 | d9= | 0.284 | | | | 1.554 |
| S9 | R9 | 14.12644 | d10= | 0.629 | nd5 | 1.5438 | ν 5  56.03 | 1.590 |
| S10 | R10 | −1.78279 | d11= | 0.139 | | | | 1.679 |
| S11 | R11 | 3.12015 | d12= | 0.380 | nd6 | 1.6700 | ν 6  19.39 | 1.890 |
| S12 | R12 | 2.62641 | d13= | 0.453 | | | | 2.315 |
| S13 | R13 | 4.19135 | d14= | 0.380 | nd7 | 1.6610 | ν 7  20.53 | 2.487 |
| S14 | R14 | 1.49352 | d15= | 0.600 | | | | 2.807 |
| S15 | R15 | ∞ | d16= | 0.210 | ndg | 1.5168 | ν g  64.20 | 3.408 |
| S16 | R16 | ∞ | d17= | 0.135 | | | | 3.484 |

Reference wavelength = 588 nm

TABLE 8

| | Cone coefficient | Aspheric surface condition | | | |
|---|---|---|---|---|---|
| | k | A4 | A6 | A8 | A10 |
| S1 | 0.0000E+00 | 2.8510E−01 | −2.3474E−01 | 2.0333E−01 | −1.0613E−01 |
| S2 | 0.0000E+00 | 5.0174E−01 | −9.6601E−01 | 9.3908E+00 | −5.6044E+01 |
| S3 | 0.0000E+00 | −8.8141E−02 | 5.1914E−01 | −4.7287E+00 | 1.9484E+01 |
| S4 | 0.0000E+00 | 2.8484E−01 | −1.4719E+00 | 2.4633E+00 | 1.0123E+00 |
| S5 | 0.0000E+00 | 4.0559E−01 | −1.7085E+00 | 4.3305E+00 | −7.6713E+00 |
| S6 | 2.7551E+00 | 1.8705E−01 | −1.1741E+00 | 3.9193E+00 | −8.4219E+00 |
| S7 | 0.0000E+00 | 1.0618E−01 | −1.4993E+00 | 4.6611E+00 | −8.2983E+00 |
| S8 | 0.0000E+00 | −3.4051E−02 | −5.4131E−01 | 1.4564E+00 | −1.9721E+00 |
| S9 | 0.0000E+00 | 2.3361E−02 | 1.0332E−01 | −5.1154E−01 | 8.3247E−01 |
| S10 | −9.9572E+00 | −4.3394E−02 | 1.0878E−01 | −1.4811E−01 | 3.1651E−02 |
| S11 | 0.0000E+00 | 1.0609E−01 | −2.3455E−01 | 1.4939E−01 | −7.3101E−02 |
| S12 | 0.0000E+00 | 1.1834E−01 | −2.8668E−01 | 2.1131E−01 | −9.1065E−02 |
| S13 | −1.7949E+01 | −9.4098E−02 | −6.2498E−02 | 8.6539E−02 | −4.5164E−02 |
| S14 | −2.0924E+00 | −2.2805E−01 | 1.1302E−01 | −3.8531E−02 | 9.2490E−03 |

| | Aspheric surface condition | | | | |
|---|---|---|---|---|---|
| | A12 | A14 | A16 | A18 | A20 |
| S1 | 1.6597E−02 | 1.1707E−02 | −2.8631E−03 | −2.4179E−03 | 7.7170E−04 |
| S2 | 2.0380E+02 | −4.4860E+02 | 5.8697E+02 | −4.1663E+02 | 1.2196E+02 |
| S3 | −4.1750E+01 | 2.6512E+01 | 4.9809E+01 | −8.4431E+01 | 2.7358E+01 |
| S4 | −1.7726E+01 | 4.5760E+01 | −6.0217E+01 | 4.1675E+01 | −1.2035E+01 |
| S5 | 9.1342E+00 | −7.1956E+00 | 3.6439E+00 | −1.0730E+00 | 1.3845E−01 |
| S6 | 1.1526E+01 | −1.0139E+01 | 5.6082E+00 | −1.7864E+00 | 2.5172E−01 |
| S7 | 9.1685E+00 | −6.4032E+00 | 2.7755E+00 | −6.8994E−01 | 7.5003E−02 |
| S8 | 1.6261E+00 | −8.3995E−01 | 2.6389E−01 | −4.5999E−02 | 3.4029E−03 |
| S9 | −7.3829E−01 | 3.9201E−01 | −1.2586E−01 | 2.2854E−02 | −1.8208E−03 |

TABLE 8-continued

| | | | | |
|---|---|---|---|---|
| S10 | 1.0269E−01 | −1.0785E−01 | 4.6636E−02 | −9.5561E−03 | 7.6005E−04 |
| S11 | 4.0861E−02 | −2.1050E−02 | 6.6740E−03 | −1.0744E−03 | 6.7191E−05 |
| S12 | 2.4196E−02 | −4.0023E−03 | 4.0885E−04 | −2.4475E−05 | 6.8251E−07 |
| S13 | 1.3685E−02 | −2.5612E−03 | 2.9214E−04 | −1.8712E−05 | 5.1869E−07 |
| S14 | −1.4762E−03 | 1.4142E−04 | −6.5825E−06 | 2.7998E−08 | 6.0249E−09 |

TABLE 9

| | |
|---|---|
| 2ω (°) | 130.0 |
| Fno | 2.20 |
| f (mm) | 2.394 |
| f1 (mm) | −4.272 |
| f2 (mm) | 3.578 |
| f3 (mm) | 4.333 |
| f4 (mm) | −4.812 |
| f5 (mm) | 2.952 |
| f6 (mm) | −35.839 |
| f7 (mm) | −3.719 |
| TTL (mm) | 6.033 |
| LB (mm) | 0.945 |
| IH (mm) | 3.552 |

Embodiment 3 is as shown in Table 16, and satisfies the relational formulas (1) to (7).

Figure 6:
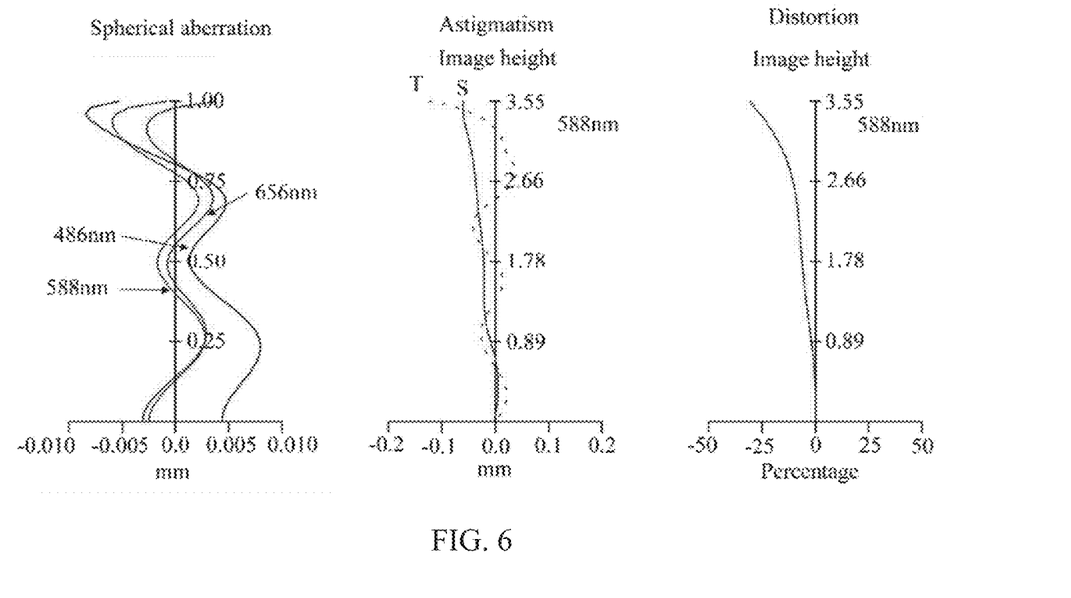
FIG. 6 is a diagram illustrating spherical aberration, astigmatism, and distortion of the camera lens LA of Embodiment 3 of the present invention.

The spherical aberration, astigmatism, and distortion of the camera lens LA of Embodiment 3 are as shown in FIG. 6. It is shown in FIG. 6 that the camera lens LA of Embodiment 3 has a wide angle with 2ω=130.0° and TTL=6.033 mm, a small size and good optical characteristics.

Embodiment 4

Figure 7:
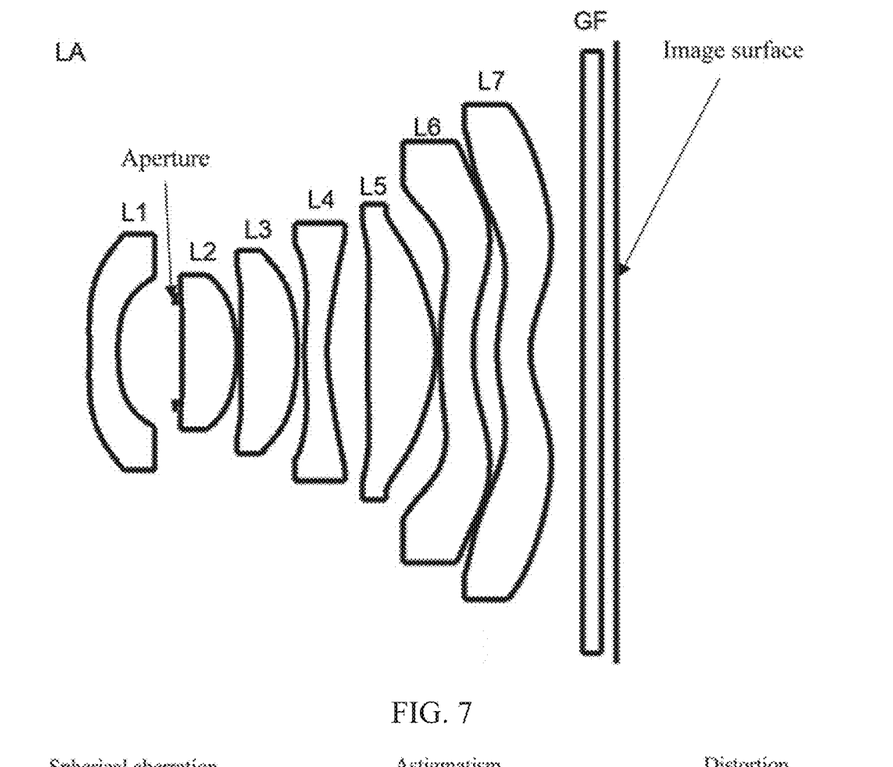
FIG. 7 is a diagram illustrating a schematic configuration of a camera lens LA of Embodiment 4 of the present invention.

FIG. 7 is a diagram illustrating a schematic configuration of a camera lens LA of Embodiment 4 of the present invention. For the object side and the image side of each of the first lens L1 to the seventh lens L7 constituting the camera lens LA of Embodiment 4, the curvature radius R, the center thickness of the lens or the distance between the lenses d, the refractive index nd, and the Abbe number ν are as shown in Table 10; a cone coefficient k and an aspheric surface coefficient are as shown in Table 11; and 2ω, Fno, f, f1, f2, f3, f4, f5, f6, f7, TTL, and IH are as shown in Table 12.

TABLE 10

| | | R | d | | nd | ν d | Effective radius (mm) |
|---|---|---|---|---|---|---|---|
| S1 | R1 | −11.56118 | d1= | 0.330 | nd1 1.5438 | ν 1 56.03 | 1.357 |
| S2 | R2 | 2.85225 | d2= | 0.655 | | | 0.868 |
| STOP | | ∞ | d3= | 0.079 | | | 0.578 |
| S3 | R3 | 44.72884 | d4= | 0.630 | nd2 1.5438 | ν 2 56.03 | 0.651 |
| S4 | R4 | −1.65283 | d5= | 0.045 | | | 0.889 |
| S5 | R5 | −12.46087 | d6= | 0.646 | nd3 1.5438 | ν 3 56.03 | 1.085 |
| S6 | R6 | −2.48720 | d7= | 0.083 | | | 1.170 |
| S7 | R7 | 5.20974 | d8= | 0.260 | nd4 1.6700 | ν 4 19.39 | 1.243 |
| S8 | R8 | 2.38487 | d9= | 0.463 | | | 1.479 |
| S9 | R9 | 203.25276 | d10= | 0.780 | nd5 1.5438 | ν 5 56.03 | 1.593 |
| S10 | R10 | −1.50071 | d11= | 0.050 | | | 1.696 |
| S11 | R11 | 5.89584 | d12= | 0.380 | nd6 1.6700 | ν 6 19.39 | 1.916 |
| S12 | R12 | 2.72926 | d13= | 0.275 | | | 2.418 |
| S13 | R13 | 2.22635 | d14= | 0.380 | nd7 1.6610 | ν 7 20.53 | 2.565 |
| S14 | R14 | 1.15972 | d15= | 0.600 | | | 2.839 |
| S15 | R15 | ∞ | d16= | 0.210 | ndg 1.5168 | ν g 64.20 | 3.373 |
| S16 | R16 | ∞ | d17= | 0.178 | | | 3.451 |

Reference wavelength = 588 nm

TABLE 11

| | Cone coefficient | Aspheric surface coefficient | | | |
|---|---|---|---|---|---|
| | k | A4 | A6 | A8 | A10 |
| S1 | 0.0000E+00 | 3.4516E−01 | −3.4278E−01 | 3.2875E−01 | −1.7876E−01 |
| S2 | 0.0000E+00 | 4.9088E−01 | −1.5136E−02 | −9.3764E−01 | 1.9897E+00 |
| S3 | 0.0000E+00 | −1.0783E−01 | 1.2138E+00 | −1.9423E+01 | 1.5981E+02 |
| S4 | 0.0000E+00 | 3.7764E−01 | −2.0760E+00 | 4.2968E+00 | −2.5229E+00 |
| S5 | 0.0000E+00 | 5.2223E−01 | −2.3130E+00 | 6.0422E+00 | −1.1390E+01 |
| S6 | 2.7404E+00 | 2.4426E−01 | −1.3332E+00 | 4.2570E+00 | −8.9332E+00 |
| S7 | 0.0000E+00 | 1.1239E−01 | −1.5765E+00 | 4.6738E+00 | −7.8808E+00 |
| S8 | 0.0000E+00 | 1.2084E−02 | −7.7159E−01 | 2.0069E+00 | −2.8032E+00 |
| S9 | 0.0000E+00 | 6.4787E−02 | 1.0233E−03 | −1.9626E−01 | 2.4698E−01 |
| S10 | −7.7602E+00 | −9.1827E−02 | 3.3732E−01 | −5.6377E−01 | 4.7608E−01 |
| S11 | 0.0000E+00 | 5.2524E−02 | −3.2997E−02 | −1.1533E−01 | 1.1184E−01 |
| S12 | 0.0000E+00 | 9.7923E−02 | −2.3190E−01 | 1.5241E−01 | −5.6389E−02 |
| S13 | −7.7253E+00 | −8.2493E−03 | −1.9926E−01 | 1.8066E−01 | −8.1730E−02 |
| S14 | −1.8385E+00 | −2.4621E−01 | 1.1084E−01 | −3.1736E−02 | 5.3359E−03 |

TABLE 11-continued

| | Aspheric surface coefficient | | | | |
|---|---|---|---|---|---|
| | A12 | A14 | A16 | A18 | A20 |
| S1 | −1.1207E−02 | 9.5189E−02 | −6.5675E−02 | 1.9131E−02 | −2.0624E−03 |
| S2 | 7.4160E+00 | −3.8702E+01 | 7.2032E+01 | −6.1833E+01 | 1.9852E+01 |
| S3 | −8.0312E+02 | 2.4930E+03 | −4.6772E+03 | 4.8647E+03 | −2.1581E+03 |
| S4 | −1.4446E+01 | 4.7070E+01 | −6.6696E+01 | 4.7977E+01 | −1.4361E+01 |
| S5 | 1.4298E+01 | −1.1324E+01 | 5.4666E+00 | −1.4816E+00 | 1.7473E−01 |
| S6 | 1.1692E+01 | −9.5868E+00 | 4.8476E+00 | −1.3922E+00 | 1.7619E−01 |
| S7 | 8.1106E+00 | −5.1009E+00 | 1.8828E+00 | −3.6599E−01 | 2.7510E−02 |
| S8 | 2.4407E+00 | −1.3531E+00 | 4.6224E−01 | −8.8468E−02 | 7.2423E−03 |
| S9 | −1.4241E−01 | 4.1797E−02 | −5.7251E−03 | 3.6711E−04 | −3.6564E−05 |
| S10 | −2.4422E−01 | 8.5275E−02 | −2.1552E−02 | 3.6845E−03 | −3.0424E−04 |
| S11 | −3.8703E−02 | 1.6781E−03 | 2.4535E−03 | −6.2896E−04 | 4.8224E−05 |
| S12 | 1.2320E−02 | −1.5144E−03 | 8.5870E−05 | −1.2844E−08 | −1.5227E−07 |
| S13 | 2.2432E−02 | −3.8823E−03 | 4.1515E−04 | −2.5153E−05 | 6.6296E−07 |
| S14 | −2.4378E−04 | −9.1668E−05 | 1.9862E−05 | −1.6370E−06 | 5.0788E−08 |

TABLE 12

| 2ω (°) | 130.0 |
|---|---|
| Fno | 2.40 |
| f (mm) | 2.351 |
| f1 (mm) | −4.174 |
| f2 (mm) | 2.945 |
| f3 (mm) | 5.587 |
| f4 (mm) | −6.817 |
| f5 (mm) | 2.743 |
| f6 (mm) | −7.968 |
| f7 (mm) | −4.267 |
| TTL (mm) | 6.043 |
| LB (mm) | 0.988 |
| IH (mm) | 3.552 |

Embodiment 4 is as shown in Table 16, and satisfies the relational formulas (1) to (7).

Figure 8:
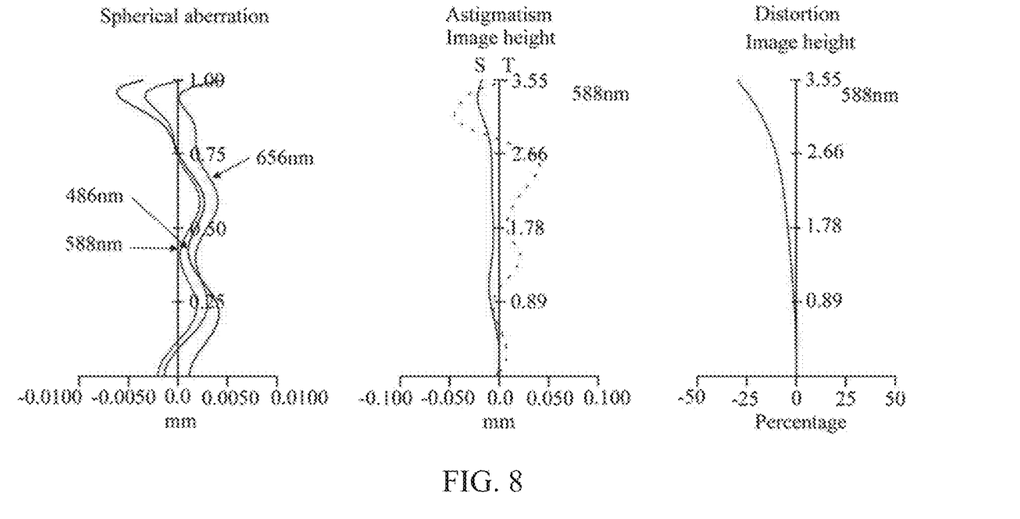
FIG. 8 is a diagram illustrating spherical aberration, astigmatism, and distortion of the camera lens LA of Embodiment 4 of the present invention.

The spherical aberration, astigmatism, and distortion of the camera lens LA of Embodiment 4 are as shown in FIG. 8. It is shown in FIG. 8 that the camera lens LA of Embodiment 4 has a wide angle with 2ω=130.0° and TTL=6.043 mm, a small size and good optical characteristics.

Embodiment 5

Figure 9:
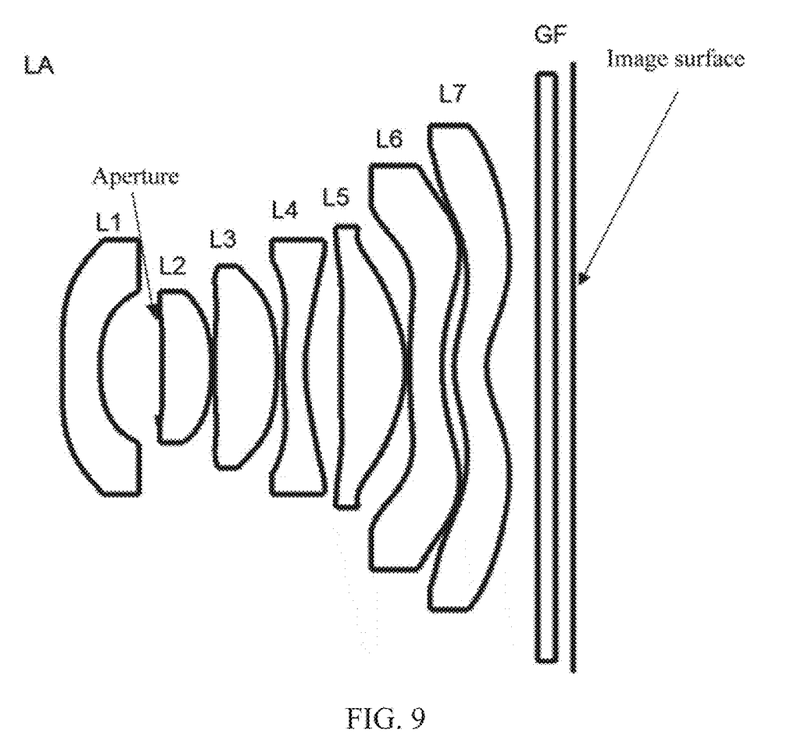
FIG. 9 is a diagram illustrating a schematic configuration of a camera lens LA of Embodiment 5 of the present invention.

FIG. 9 is a diagram illustrating a schematic configuration of a camera lens LA of Embodiment 5 of the present invention. For the object side and the image side of each of the first lens L1 to the seventh lens L7 constituting the camera lens LA of Embodiment 5, the curvature radius R, the center thickness of the lens or the distance between the lenses d, the refractive index nd, and the Abbe number ν are as shown in Table 13; a cone coefficient k and an aspheric surface coefficient are as shown in Table 14; and 2ω, Fno, f, f1, f2, f3, f4, f5, f6, f7, TTL, and IH are as shown in Table 15.

TABLE 13

| | | R | d | nd | ν d | Effective radius (mm) |
|---|---|---|---|---|---|---|
| S1 | R1 | −17.51013 | d1= 0.442 | nd1 1.5438 | ν 1 56.03 | 1.500 |
| S2 | R2 | 2.68178 | d2= 0.679 | | | 0.906 |
| STOP | | ∞ | d3= 0.052 | | | 0.594 |
| S3 | R3 | −66.86596 | d4= 0.580 | nd2 1.5438 | ν 2 56.03 | 0.636 |
| S4 | R4 | −1.80767 | d5= 0.033 | | | 0.893 |
| S5 | R5 | 88.78659 | d6= 0.734 | nd3 1.5438 | ν 3 56.03 | 1.173 |
| S6 | R6 | −2.54039 | d7= 0.073 | | | 1.199 |
| S7 | R7 | 4.28188 | d8= 0.260 | nd4 1.6700 | ν 4 19.39 | 1.272 |
| S8 | R8 | 2.20327 | d9= 0.418 | | | 1.504 |
| S9 | R9 | 278.76550 | d10= 0.757 | nd5 1.5438 | ν 5 56.03 | 1.567 |
| S10 | R10 | −1.43659 | d11= 0.050 | | | 1.661 |
| S11 | R11 | 9.17410 | d12= 0.380 | nd6 1.6700 | ν 6 19.39 | 1.923 |
| S12 | R12 | 2.70766 | d13= 0.142 | | | 2.379 |
| S13 | R13 | 1.37133 | d14= 0.380 | nd7 1.6610 | ν 7 20.53 | 2.591 |
| S14 | R14 | 0.91155 | d15= 0.600 | | | 2.856 |
| S15 | R15 | ∞ | d16= 0.210 | ndg 1.5168 | ν g 64.20 | 3.378 |
| S16 | R16 | ∞ | d17= 0.211 | | | 3.458 |

Reference wavelength = 588 nm

TABLE 14

| | Cone coefficient | Aspheric surface coefficient | | | |
|---|---|---|---|---|---|
| | k | A4 | A6 | A8 | A10 |
| S1 | 0.0000E+00 | 2.4343E−01 | −1.9291E−01 | 1.5740E−01 | −8.0642E−02 |
| S2 | 0.0000E+00 | 3.5552E−01 | 3.8357E−01 | −2.2132E+00 | 3.7457E+00 |
| S3 | 0.0000E+00 | −1.0882E−01 | 4.9358E−01 | −6.1907E+00 | 3.5220E+01 |
| S4 | 0.0000E+00 | 3.6017E−01 | −2.3760E+00 | 6.5001E+00 | −1.0159E+01 |
| S5 | 0.0000E+00 | 4.9156E−01 | −2.4352E+00 | 7.1900E+00 | −1.4795E+01 |
| S6 | 2.9607E+00 | 2.7106E−01 | −1.7711E+00 | 6.1911E+00 | −1.3823E+01 |
| S7 | 0.0000E+00 | 1.3342E−01 | −1.7919E+00 | 5.2936E+00 | −8.8168E+00 |
| S8 | 0.0000E+00 | 2.3013E−02 | −8.6781E−01 | 2.2759E+00 | −3.2340E+00 |
| S9 | 0.0000E+00 | 8.0853E−02 | −1.5859E−01 | 2.4051E−01 | −4.4691E−01 |
| S10 | −5.2029E+00 | −8.0992E−02 | 2.3423E−01 | −3.3229E−01 | 2.4165E−01 |
| S11 | 0.0000E+00 | 1.6363E−02 | −2.2061E−02 | −6.8726E−03 | 2.5542E−02 |
| S12 | 0.0000E+00 | 1.5771E−02 | −6.1940E−02 | 6.7249E−03 | 1.6362E−02 |
| S13 | −5.6999E+00 | −1.3866E−01 | 2.8578E−02 | 1.2752E−02 | −1.1346E−02 |
| S14 | −3.7923E+00 | −1.8326E−01 | 1.1542E−01 | −5.9169E−02 | 2.1288E−02 |

| | Aspheric surface coefficient | | | | |
|---|---|---|---|---|---|
| | A12 | A14 | A16 | A18 | A20 |
| S1 | 1.5558E−02 | 7.2247E−03 | −4.5952E−03 | 6.4820E−04 | 1.5672E−05 |
| S2 | 8.7418E+00 | −4.6010E+01 | 7.8545E+01 | −6.1060E+01 | 1.7802E+01 |
| S3 | −1.1581E+02 | 1.8461E+02 | −2.9342E+01 | −2.8956E+02 | 2.6038E+02 |
| S4 | 1.9279E+00 | 2.3707E+01 | −4.4126E+01 | 3.4455E+01 | −1.0621E+01 |
| S5 | 1.9985E+01 | −1.7049E+01 | 8.8464E+00 | −2.5494E+00 | 3.1300E−01 |
| S6 | 1.9406E+01 | −1.7358E+01 | 9.7229E+00 | −3.1257E+00 | 4.4235E−01 |
| S7 | 8.7053E+00 | −5.0666E+00 | 1.6504E+00 | −2.6045E−01 | 1.2722E−02 |
| S8 | 2.8496E+00 | −1.5896E+00 | 5.4534E−01 | −1.0508E−01 | 8.7101E−03 |
| S9 | 5.3775E−01 | −3.7174E−01 | 1.4705E−01 | −3.1101E−02 | 2.7290E−03 |
| S10 | −1.3296E−01 | 5.8591E−02 | −2.6304E−02 | 5.7066E−03 | −5.1112E−04 |
| S11 | 1.5861E−02 | −1.5330E−02 | 5.1325E−03 | −8.0878E−04 | 5.0047E−05 |
| S12 | −1.1278E−02 | 3.4959E−03 | −5.8117E−04 | 5.0278E−05 | −1.7862E−06 |
| S13 | 3.6794E−03 | −5.1811E−04 | 5.4290E−05 | −2.1336E−06 | 1.7998E−08 |
| S14 | −4.9240E−03 | 7.1084E−04 | −6.1731E−05 | 2.9411E−06 | −5.8861E−08 |

TABLE 15

| | |
|---|---|
| 2ω (°) | 130.0 |
| Fno | 2.20 |
| f (mm) | 2.210 |
| f1 (mm) | −4.244 |
| f2 (mm) | 3.406 |
| f3 (mm) | 4.555 |
| f4 (mm) | −7.132 |
| f5 (mm) | 2.631 |
| f6 (mm) | −5.872 |
| f7 (mm) | −6.129 |
| TTL (mm) | 6.000 |
| LB (mm) | 1.021 |
| IH (mm) | 3.552 |

Embodiment 5 is as shown in Table 16, and satisfies the relational formulas (1) to (7).

Figure 10:
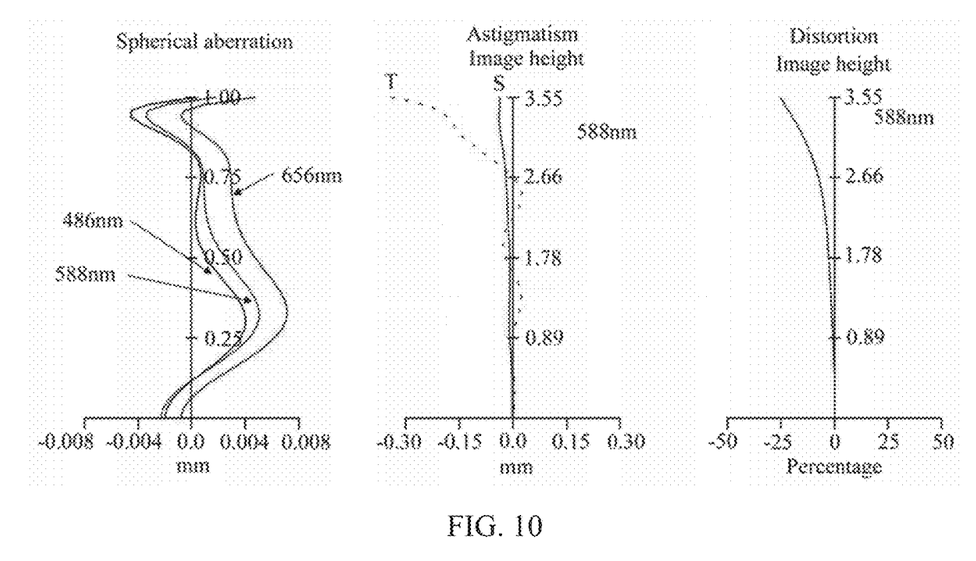
FIG. 10 is a diagram illustrating spherical aberration, astigmatism, and distortion of the camera lens LA of Embodiment 5 of the present invention.

The spherical aberration, astigmatism, and distortion of the camera lens LA of Embodiment Five are as shown in FIG. 10. It is shown in FIG. 10 that the camera lens LA of Embodiment 5 has a wide angle with 2ω=130.0° and TTL=6.000 mm, a small size and good optical characteristics.

Table 16 shows the values corresponding to the parameters defined by the relational formulas (1) to (7) of Embodiment 1 to Embodiment 5.

TABLE 16

| | Embodiment 1 | Embodiment 2 | Embodiment 3 | Embodiment 4 | Embodiment 5 | Notes |
|---|---|---|---|---|---|---|
| f1/f | −1.680 | −1.990 | −1.784 | −1.776 | −1.921 | Formula (1) |
| f2/f | 1.220 | 1.590 | 1.495 | 1.253 | 1.541 | Formula (2) |
| |R3/R4| | 10.020 | 59.900 | 59.899 | 27.062 | 36.990 | Formula (3) |
| f3/f | 2.980 | 2.185 | 1.810 | 2.377 | 2.061 | Formula (4) |
| f4/f | −2.847 | −3.990 | −2.010 | −2.900 | −3.228 | Formula (5) |
| |R5/R6| | 7.077 | 13.617 | 11.937 | 5.010 | 34.950 | Formula (6) |
| D23/f | 0.502 | 0.685 | 0.602 | 0.562 | 0.609 | Formula (7) |

What is claimed is:

1. A camera lens, comprising, sequentially from an object side:
a first lens having a negative refractive power;
a second lens having a positive refractive power;
a third lens having a positive refractive power;
a fourth lens having a negative refractive power;
a fifth lens having a positive refractive power;
a sixth lens having a negative refractive power; and
a seventh lens having a negative refractive power,
wherein the camera lens satisfies relational formulas (1)-(3):

$$-2.00 \leq f1/f \leq -1.67 \quad (1)$$

$$1.20 \leq f2/f \leq 1.60 \quad (2)$$

$$10.00 \leq |R3/R4| \leq 60.00 \quad (3)$$

where,
f represents a focal length of the camera lens as a whole,
f1 represents a focal length of the first lens,
f2 represents a focal length of the second lens,
R3 represents a curvature radius of an object side surface of the second lens, and
R4 represents a curvature radius of an image side surface of the second lens.

2. The camera lens as described in claim 1, further satisfying a relational formula (4):

$$1.80 \leq f3/f \leq 3.00 \quad (4)$$

where f3 represents a focal length of the third lens.

3. The camera lens as described in claim 1, further satisfying a relational formula (5):

$$-4.00 \leq f4/f \leq -2.00 \quad (5)$$

where f4 represents a focal length of the fourth lens.

4. The camera lens as described in claim 1, further satisfying a relational formula (6):

$$5.00 \leq |R5/R6| \leq 35.00 \quad (6)$$

where,
R5 represents a curvature radius of an object side surface of the third lens, and
R6 represents a curvature radius of an image side surface of the third lens.

5. The camera lens as described in claim 1, further satisfying a relational formula (7):

$$0.50 \leq D23/f \leq 0.70 \quad (7)$$

where D23 represents an on-axis distance from the object side surface of the second lens to an image side surface of the third lens.

* * * * *